(12) United States Patent
Hue et al.

(10) Patent No.: US 11,030,897 B2
(45) Date of Patent: Jun. 8, 2021

(54) COMMUNICATION DEVICE, NOTABLY FOR MOTOR VEHICLES

(71) Applicant: VALEO VISION, Bobigny (FR)

(72) Inventors: David Hue, Bobigny (FR); Marine Courcier, Bobigny (FR); Vanesa Sanchez, Bobigny (FR); Kostadin Beev, Bobigny (FR); Pierre Albou, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/899,392

(22) Filed: Feb. 20, 2018

(65) Prior Publication Data

US 2018/0240338 A1 Aug. 23, 2018

(30) Foreign Application Priority Data

Feb. 17, 2017 (FR) ...................................... 17 51277

(51) Int. Cl.
*G08G 1/09* (2006.01)
*H04B 10/114* (2013.01)
*H04B 10/116* (2013.01)
*B60Q 1/50* (2006.01)
*G08G 1/0967* (2006.01)

(52) U.S. Cl.
CPC .............. *G08G 1/092* (2013.01); *B60Q 1/50* (2013.01); *G08G 1/094* (2013.01); *G08G 1/096791* (2013.01); *H04B 10/116* (2013.01); *H04B 10/1143* (2013.01); *G08G 1/096708* (2013.01)

(58) Field of Classification Search
CPC .......... B60Q 1/50; G08G 1/092; G08G 1/094; G08G 1/096791; G08G 1/096708; H04B 10/116; H04B 10/1143
See application file for complete search history.

(56) References Cited

U.S. PATENT DOCUMENTS 5,052,799 A * 10/1991 Sasser .................. G05D 1/0246
356/139.03
6,310,707 B1 10/2001 Kawase et al.
(Continued)

FOREIGN PATENT DOCUMENTS

EP 1 515 292 A1 6/2003

OTHER PUBLICATIONS

Preliminary French Search Report dated Oct. 18, 2017 in French Application 17 51277 filed Feb. 17, 2017 (with English Translation of Categories of Cited Documents).
(Continued)

*Primary Examiner* — Ramsey Refai
(74) *Attorney, Agent, or Firm* — Oblon, McClelland, Maier & Neustadt, L.L.P.

(57) ABSTRACT

A communication device, notably for motor vehicles, including a transmission system equipped with a light source designed to emit an initial light beam, the transmission system being configured for generating a first light beam polarized in a first direction starting from the initial light beam, the transmission system furthermore including a modulator of the direction of polarization of the first polarized light beam in such a manner as to transmit information, the device furthermore including a receiver system configured for detecting the first polarized light beam when it is polarized in the first direction and for transmitting the information.

18 Claims, 2 Drawing Sheets

(56) References Cited

U.S. PATENT DOCUMENTS

| | | | |
|---|---|---|---|
| 7,764,194 B2* | 7/2010 | Osanai | H04B 10/116 |
| | | | 340/903 |
| 9,432,068 B2* | 8/2016 | Stahlin | B60Q 1/0017 |
| 9,970,616 B2* | 5/2018 | Ahn | F21S 41/135 |
| 2002/0001198 A1* | 1/2002 | Eschler | F21S 41/60 |
| | | | 362/510 |
| 2006/0119489 A1 | 6/2006 | Shinada et al. | |
| 2006/0269293 A1 | 11/2006 | Sunaga et al. | |
| 2017/0191636 A1* | 7/2017 | Khrushchev | B60Q 1/1423 |

OTHER PUBLICATIONS

Office Action dated Aug. 4, 2020 in Chinese Application No. 201810147868.2 with "concise" English translation.

* cited by examiner

COMMUNICATION DEVICE, NOTABLY FOR MOTOR VEHICLES

BACKGROUND OF THE INVENTION

Field of the Invention

The present invention relates to a communication device, notably for motor vehicles.

Description of the Related Art

In the field of motor vehicles, it is often sought to provide communication devices between vehicles which allow indications to be given to others of the intentions or the driving style of a driver. Thus, there commonly exist signalling devices which allow other vehicles to anticipate the behaviour of a vehicle, such as the direction indicators for example, which shows that the driver of the vehicle wishes to turn, or the specific brake lights which come on to warn of an emergency situation.

These means are however very limited, because they are only based on visual information of colour or of lighting rhythm. Thus, in order to improve the safety and the behaviour of vehicles on roads, it is currently desired to increase the capacity for transfer of information between vehicles, and to have real communications systems for vehicles.

The document US2006/0119489 is for example known, in which communication devices for vehicles use the normal lights of the vehicle or signalling lights of traffic control equipment. In order to transfer information, the light emitted by the lamp is modulated in a pulsed mode. In other words, the lamp is alternately switched from an off state to an on state, in such a manner as to be able to encode information. The modulation period is chosen to be shorter than the retinal persistence, so that the modulation cannot be perceived by the human eye. A vehicle is equipped with a detector which decodes the pulsed modulation of the light signal in order to decode and transfer the information, for example to the driver via a digital screen.

However, the use of such lamps lacks efficiency, notably when the light sources of the lamps are electroluminescent light sources, notably light-emitting diodes. This is because light-emitting diodes lose efficiency, the reason being that the light intensity from an LED powered by an average current in pulsed mode, the peak current being relatively high, is lower than light intensity from the same LED powered by the same current means in continuous mode.

An electroluminescent light source is a source comprising at least one material emitting light in response to an electrical current flowing through it, or to a high electric field. Such sources are for example light-emitting diodes, OLEDs (for "organic light emitting diodes") or PLEDs (for "polymer light emitting diodes").

Other transmitter-receiver systems envisaged are based on the use of radiofrequency waves for transmitting information. However, this necessitates installing specific transmitters and receivers in the vehicles, which is costly. Furthermore, it is difficult to distinguish from which vehicle the radiofrequency waves originate.

BRIEF SUMMARY OF THE INVENTION

The aim of the invention is to overcome these drawbacks and to provide a communication device that is simple to install within a vehicle, and is efficient in the transmission of information between vehicles. More precisely, having to make use of a modulation of the light intensity, which involves variations in light intensity as a function of the data exchanged, is to be avoided.

For this purpose, the invention relates to a communication device, notably for motor vehicles, comprising a transmission system equipped with a light source designed to emit an initial light beam, the transmission system being configured for generating a first light beam polarized in a first direction starting from the initial light beam, the transmission system furthermore comprising a modulator of the direction of polarization of the first polarized light beam in such a manner as to transmit information, the device furthermore comprising a receiver system configured for detecting the said first light beam polarized in said first direction and for transmitting the said information.

Thus, the modulated polarized light beam allows information to be easily transmitted, for example for motor vehicles or for a vehicle and highway infrastructure equipment. Indeed, the receiver system only detects the first polarized light beam when the latter is polarized in the first direction. By modulating the direction of polarization of the first beam, information can be transmitted. The intensity of the illumination of the first beam supplied by the transmission system is substantially the same because only the polarization is modified.

The device may notably operate with the usual vehicle lights as light source for the transmission system, so as to avoid having to employ additional light sources. Moreover, by virtue of the invention, starting from a single light source, a lighting beam having a specific function, for example a side light, and means for transmitting information using the same initial light beam are obtained.

According to various embodiments of the invention, which could be taken together or separately:
- the modulator comprises a screen capable of modulating the polarization of the first polarized light beam between the first direction of polarization and a second direction of polarization,
- the first and the second direction of polarization are orthogonal,
- the modulator comprises a liquid crystal screen switchable between a first configuration in which the first polarized light beam is transmitted in the first direction of polarization, and a second configuration in which the first polarized light beam is transmitted in the second direction of polarization,
- the transmission system comprises a linear separator configured for dividing the initial light beam so as to form the first polarized light beam and a second light beam polarized in the second direction of polarization,
- the transmission system is configured for generating a lighting beam starting from the initial light beam,
- the transmission system is configured so that the lighting beam is in part formed by the first polarized light beam irrespective of its direction of polarization,
- the transmission system is configured for recombining the first light beam polarized in the first direction and the second polarized light beam in such a manner as to form the lighting beam,
- the transmission system comprises a second separator configured for reflecting the first light beam polarized in the first direction of polarization, and transmitting the first light beam polarized in the second direction,
- the light source comprises an electroluminescent light source, the electroluminescent light source comprises at least one semiconductor emitter element, the light source is an unpolarized light source, such as a light-emitting diode, the light source is a polarized light source, such as a laser source, the transmission system comprises a wavelength conversion element, of the photoluminescent type, configured for transforming the initial polarized light beam into an unpolarized light beam, the receiver system comprises a photo-detector and a polarizing filter configured for allowing light polarized in the first direction to pass.

The invention also relates to a transmission system for such a communication device according to the invention.

The invention furthermore relates to a lighting device, notably for motor vehicles, comprising such a communication device.

BRIEF DESCRIPTION OF THE SEVERAL VIEWS OF THE DRAWINGS

The invention will be better understood in the light of the following description which is presented purely by way of illustration and which is not intended to limit it, accompanied by the appended drawings amongst which.

DETAILED DESCRIPTION OF THE INVENTION

The invention relates to a communication device comprising a transmission system and a receiver system. The device is for example arranged on motor vehicles, not shown in the figures, in order to transfer information from one vehicle to another. In particular, a transmission system of a vehicle is configured for transmitting information to a receiver system of the other vehicle, and vice versa.

Figure 1:
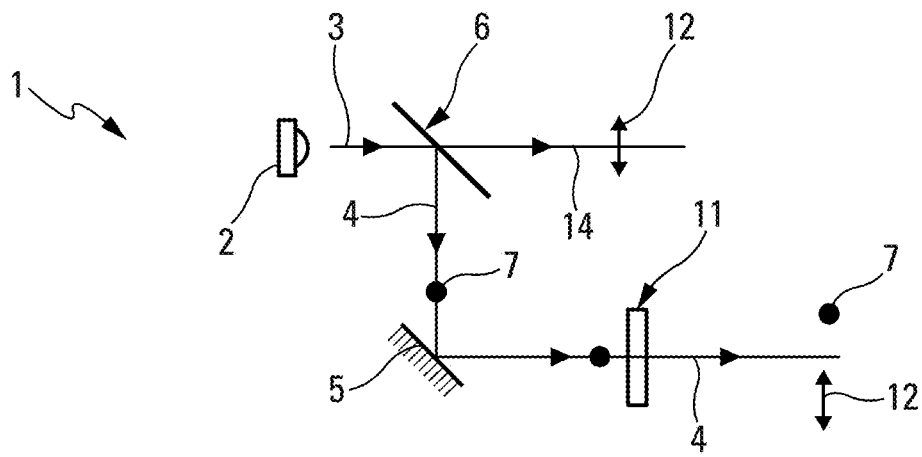
FIG. 1 illustrates schematically a first embodiment of a transmission system of a communication device according to the invention.

As illustrated in FIG. 1, the transmission system 1 is equipped with a light source 2 designed to emit an initial light beam 3. In this embodiment, the light source 2 is an unpolarized light source, such as a light-emitting diode. The light source 2 is for example a source of a usual vehicle light, such as a low-beam headlight.

The transmission system 1 is configured for generating a first light beam 4 polarized in a first direction 7 starting from the initial light beam 3. The beam polarized in the first direction 7 is represented by a full circle. For this purpose, the transmission system 1 comprises a separator 6, preferably linear, configured for dividing the initial light beam 3 and forming the first polarized light beam 4. The separator 6, which is for example a polarizer, is preferably arranged in the optical axis of the light source 2. Here, the separator 6 reflects the part of the initial light beam 3 oriented in the first direction, this part forming the first polarized light beam 4, which here is directed substantially perpendicularly to the optical axis. The transmission system 1 advantageously comprises collimation optics, not shown in the figures, disposed between the light source 2 and the separator 6. Such a separator 6 comprises for example a wire grid polarizer, or a polarizer of the Glan-Thomson or Wollaston type, or else a prism of the Nicol type.

In other embodiments, yet other types of polarizer may be used allowing an orientation of the polarized beams other than perpendicular and/or parallel to the optical axis to be obtained.

Figure 3:
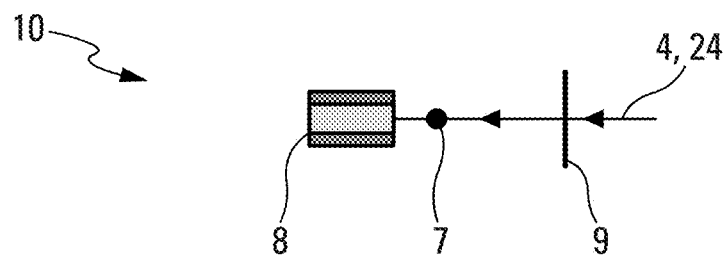
FIG. 3 illustrates schematically a receiver system of a communication device according to the invention.

The receiver system 10, shown in FIG. 3, is configured for detecting the said first light beam 4, 24 polarized in said first direction 7 and for transmitting the said information. The receiver system 10 is equipped with a photodetector 8 and with a polarizing filter 9 configured for allowing the polarized light oriented in the first direction 7 to pass. The polarizing filter 9 is disposed in front of the detector 8 so that the latter only detects the light beam 4 polarized in said first direction 7.

According to the invention, the transmission system 1 also comprises a modulator 11 of the direction of polarization of the first polarized light beam 4, as shown in FIG. 1. The modulation consists in emitting the first light beam 4 polarized in the first direction 7 intermittently in such a manner that the detector detects the first beam 7 in a fractional manner over time, which allows an encoding of the information to be transmitted by the transmission system 1 and a decoding by the detection system. Preferably, the modulator 11 is capable of instantaneously modifying the angle of polarization of the first polarized beam 4 in such a manner as to be able to encode and transmit information. Thus, when the first beam 4 is polarized in the first direction 7, the detection system detects the first beam 4 and when the first beam is directed in a second direction 12, the detection system does not detect the first polarized beam 4. The first 7 and second 12 directions are advantageously orthogonal so that they are clearly differentiated, which depends on the type of separator chosen. The second direction 12 is represented in the figure by a double arrow.

The modulator 11 here comprises a screen capable of modulating the polarization of the first polarized light beam 4 between said first direction 4 of polarization and the second direction 12 of polarization. The screen is for example a liquid crystal screen switchable between a first configuration in which the first polarized light beam 4 is transmitted in the first direction of polarization 7, and a second configuration in which the first polarized light beam 4 is transmitted in the second direction of polarization 12. In the liquid crystal layer of the screen, the direction of the polarized light may be modified by the liquid crystals. Indeed, when the liquid crystals are disposed in chiral layers, they transmit the first polarized beam 4 while modifying its polarization into the second direction 12. On the other hand, when the liquid crystals are oriented isotropically in the same direction, that of the applied electric field, they transmit the beam with the same direction of polarization, here the first direction 7. Thus, the orientation of the liquid crystals determine the direction of polarization of the light.

The modulator is, for example, equipped with a control device, not shown in the figures, configured for controlling the switching of the screen from one configuration to the other, and to thus cause the modulation of the first light beam 4. The control device is moreover configured for generating the encoding of the said information by virtue of the modulation by the screen. In addition, here, a mirror 5 is arranged to reflect the first polarized light beam 4 towards the modulator 11 at the exit of the separator 6.

The transmission system 1 is advantageously configured so that the lighting beam is in part formed by the first polarized light beam 4, and this is independent of its direction of polarization. The first polarized beam 4 is emitted with a substantially constant intensity, even when its polarization is modulated. Thus, the emitted intensity of the lighting beam is substantially equal to the sum of the intensities of the first polarized beam and of the second polarized beam. In this case, the mirror 5 furthermore plays the role of re-aligning the first 4 and second 14 beams in order for them to form together, at least in part, the lighting beam generated by the transmission system 1.

In one alternative embodiment, the transmission system 1 is configured for generating a lighting beam starting from the initial light beam 3. For this purpose, the separator 6 is designed to generate a second light beam 14 different from the first. Here, the second light beam 14 is polarized in the second direction 12 of polarization. Here, the second light beam 14 is transmitted by the separator 6 along the same optical axis as the initial beam 3. The second polarized beam 14 preferably forms, at least in part, the lighting beam generated by the transmission system 1.

The receiver system 10 detects the first light beam 4 polarized in the first direction 7, and does not detect either the first light beam 4, when the latter is polarized in the second direction 12, or the second beam 14 also polarized in the second direction 12. A lighting beam of constant intensity is thus obtained, in which the first light beam has a direction of polarization that is switchable between the two directions 7, 12 in order to transmit information. By virtue of the invention, the lighting beam allows information to be transmitted without any loss of light intensity.

In another embodiment, the receiver system detects the second beam 14 polarized in the second direction 12 and the first light beam 4 polarized in the second direction 12, and does not detect the first light beam 4 when the latter is polarized in the first direction 7. A lighting beam of constant intensity is thus obtained in which the first light beam has a direction of polarization that is switchable between the two directions 7, 12 in order to transmit information. By virtue of the invention, the lighting beam allows information to be transmitted without any loss of light intensity.

Figure 2:
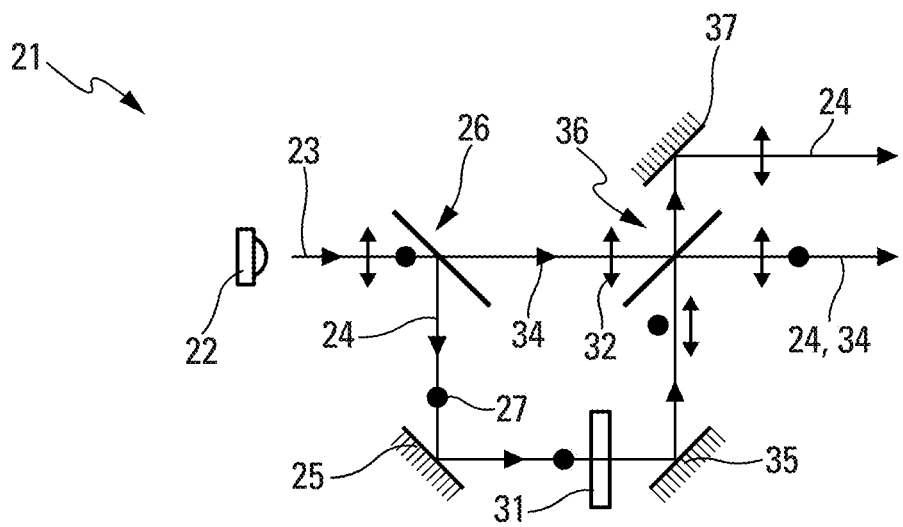
FIG. 2 illustrates schematically a second embodiment of a transmission system of a communication device according to the invention.

In FIG. 2, the second embodiment shows a transmission system 21 comprising a source 22 generating an initial beam 23, a first separator 26, a mirror 25 and a modulator 31, which are disposed in the same manner as in the first embodiment, in order to obtain a first light beam 24 polarized in a first direction 27 or a second direction 32 and a second light beam 34 polarized in the second direction 32. The second embodiment allows the first light beam 24 polarized in the first direction 27 and the second light beam 34 polarized in the second direction 32 to be recombined. In other words, the two beams 24, 32 are substantially oriented along the same optical axis.

For this purpose, the transmission system 21 additionally comprises a first separator 26 and a second separator 36 arranged at the intersection of the first polarized light beam 24 at the exit of the modulator 31, and of the second polarized light beam 34. The second separator 36 has the function of diverting the first polarized beam 24 when it is in the first direction of polarization, in the same direction as the second polarized light beam. On the other hand, the separator 36 allows the light which is polarized in the second direction to pass. Thus, when the first beam 24 is polarized in the second direction 32, it passes through the separator without being diverted. Similarly, the second light beam 34, which arrives from a transverse direction, passes through the separator 36. The first light beam 24 is diverted along the same optical axis as that of the second polarized light beam 34, only when it is polarized in the first direction 27 of polarization.

The transmission system 21 here is equipped with a first additional mirror 35 and with a second additional mirror 37. The first mirror 35 is arranged for reflecting the first polarized light beam 24 towards the second separator 36, after the modulator 31. The second mirror 37 reflects the first light beam polarized in the second direction 32, after transmission through the second separator, in such a manner as to direct it in a preferred direction.

In this embodiment, the lighting beam of the device is formed by the recombination of the first light beam 24 polarized in the first direction 27 and the second light beam 34 polarized in the second direction 32. The first light beam 24 polarized in the second direction 32 is shifted. It can also be used to form the lighting beam in order for the lighting beam to maintain a constant intensity during the modulation.

Figure 4:
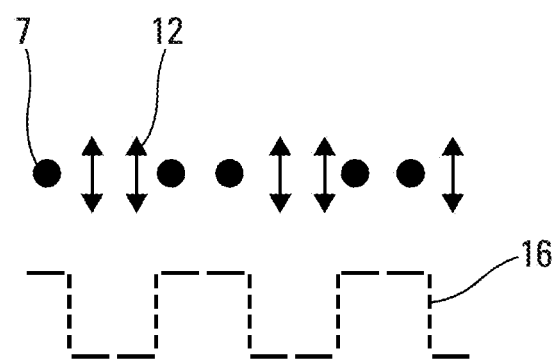
FIG. 4 illustrates schematically the transmission of information during the operation of the device.

FIG. 4 illustrates the detection of the light that the receiver receives as a function of the polarization of the first light beam. A light detection signal is therefore obtained, which here is a square-wave function 16, and allows information to be encoded. When the polarization of the first light beam is oriented in the first direction 7, the first beam passes through the polarizing filter of the receiver so as to reach the detector, and the signal has the high value of the square function. When the polarization of the first light beam is oriented in the second direction 12, the signal has the low value of the square function, because the first light beam does not pass through the filter and the detector does not receive any light.

Thus, by activating the modulator, information to be transmitted from the transmission system to the receiver system may be encoded by modulation.

In a first variant embodiment, not shown in the figures, the light source is a polarized light source, such as a laser source. The laser source allows the first polarized beam to be directly obtained. The initial beam is nevertheless separated into two by a separator in order to obtain a first and a second polarized beam.

Alternatively, the transmission system additionally comprises a wavelength conversion element configured for transforming the initial polarized light beam into an unpolarized light beam. Such a converter of light comprises a light-emitting material designed to absorb at least a part of an excitation light emitted by a light source, and to convert at least a part of the said absorbed excitation light into an emission light having a wavelength different of that of the excitation light. Since the light-emitting material scatters the emitted and transmitted light, the light of the light beam thus generated is unpolarized. The modulation and the separation are carried out after the wavelength conversion of the initial beam by the converter. In this case, only a part of the converted initial beam is used for the communication. A filter tuned to the wavelength of the laser may furthermore be used to increase the signal-to-noise ratio. It should be noted that the converted initial beam is either the light transmitted by the luminescent material, the light converted by the luminescent material, or the additive synthesis of the transmitted light and the converted light by the luminescent material.

In a second variant embodiment, not shown in the figures, the light source is an infrared source which generates an infrared initial light beam. The operation is the same as in the previous embodiments.

In another embodiment, not shown in the figures, the modulation of the polarization of the first light beam is associated with a pulsed modulation of the illumination of the light source. Thus, two communication channels may be used and the capacity and the speed of transfer of information between the transmission system and the receiver system increased. The pulsed-modulation frequency is preferably implemented at high frequency.

The invention claimed is:

1. A communication device, for motor vehicles, comprising:
    a transmission system comprising
        a light source configured to emit an initial light beam, the transmission system being configured to generate a first light beam polarized in a first direction from the initial light beam, and
        a modulator configured to modulate a direction of polarization of the first light beam between the first direction of polarization and a second direction of polarization in such a manner as to transmit information, the second direction of polarization being different than the first direction of polarization; and
    a receiver system configured for detecting the first light beam when the first light beam is polarized in said first direction and for transmitting the information.

2. The communication device according to claim 1, wherein the modulator comprises a screen capable of modulating the polarization of the first light beam between the first direction of polarization and the second direction of polarization.

3. The communication device according to claim 2, wherein the first direction of polarization and the second direction of polarization are orthogonal.

4. The communication device according to claim 2, wherein the modulator comprises a liquid crystal screen switchable between a first configuration wherein the first light beam is transmitted in the first direction of polarization, and a second configuration wherein the first light beam is transmitted in the second direction of polarization.

5. The communication device according to claim 3, wherein the transmission system comprises a linear separator configured for dividing the initial light beam so as to form the first light beam polarized in the first direction of polarization and a second light beam polarized in the second direction of polarization.

6. The communication device according to claim 1, wherein the transmission system is configured to generate a lighting beam from the initial light beam.

7. The communication device according to claim 6, wherein the transmission system is configured so that the lighting beam is in part formed by the first light beam irrespective of its direction of polarization.

8. The communication device according to claim 7, wherein the transmission system is configured for recombining the first light beam polarized in the first direction of polarization and a second light beam polarized in the second direction of polarization in such a manner as to form the lighting beam.

9. The communication device according to claim 8, wherein the transmission system comprises a second separator configured for reflecting the first light beam polarized in the first direction of polarization, and transmitting the first light beam polarized in the second direction.

10. The communication device according to claim 1, wherein the light source is an unpolarized light source.

11. The communication device according to claim 1, wherein the light source is a polarized light source.

12. The communication device according to claim 11, wherein the transmission system comprises a wavelength conversion element configured for transforming the polarized initial light beam into an unpolarized light beam.

13. The communication device according to claim 1, wherein the receiver system comprises a photodetector and a polarizing filter configured for allowing the light polarized in the first direction to pass.

14. The communication device according to claim 3, wherein the modulator comprises a liquid crystal screen switchable between a first configuration in which the first light beam is transmitted in the first direction of polarization, and a second configuration wherein the first light beam is transmitted in the second direction of polarization.

15. The communication device according to claim 4, wherein the transmission system comprises a linear separator configured for dividing the initial light beam so as to form the first light beam polarized in the first direction of polarization and a second light beam polarized in the second direction of polarization.

16. The communication device according to claim 2, wherein the transmission system is configured for generating a lighting beam starting from the initial light beam.

17. The communication device according to claim 2, wherein the light source is an unpolarized light source.

18. The communication device according to claim 2, wherein the light source is a polarized light source.

* * * * *